US012637341B2

(12) United States Patent
Clark

(10) Patent No.: US 12,637,341 B2
(45) Date of Patent: May 26, 2026

(54) LIFT DEVICE AND METHOD OF CONTROLLING

(71) Applicant: Terex South Dakota, Inc., Watertown, SD (US)

(72) Inventor: Brian M. Clark, Seattle, WA (US)

(73) Assignee: Terex South Dakota, Inc., Watertown, SD (US)

( * ) Notice: Subject to any disclaimer, the term of this patent is extended or adjusted under 35 U.S.C. 154(b) by 978 days.

(21) Appl. No.: 17/475,626

(22) Filed: Sep. 15, 2021

(65) Prior Publication Data

US 2023/0077831 A1 Mar. 16, 2023

(51) Int. Cl.

| | |
|---|---|
| ***B66F 13/00*** | (2006.01) |
| ***B66C 13/30*** | (2006.01) |
| ***B66F 11/04*** | (2006.01) |
| ***F15B 13/02*** | (2006.01) |
| ***F15B 13/08*** | (2006.01) |

(52) U.S. Cl.

CPC .............. *B66F 13/00* (2013.01); *B66C 13/30* (2013.01); *B66F 11/042* (2013.01); *B66F 11/044* (2013.01); *F15B 13/024* (2013.01); *F15B 13/08* (2013.01)

(58) Field of Classification Search

CPC ...... B66F 11/042; B66F 11/044; B66F 13/00; B66C 13/30; F15B 13/024; F15B 13/08; Y10T 137/87217

USPC ...................................................... 137/596.17

See application file for complete search history.

(56) References Cited

U.S. PATENT DOCUMENTS

| | | | | |
|---|---|---|---|---|
| 5,388,400 | A * | 2/1995 | Hoppenstedt ........... | F01N 9/002 60/303 |
| 5,992,562 | A | 11/1999 | Boeckman et al. | |
| 8,844,660 | B2 * | 9/2014 | Kawashima .......... | E02F 9/2217 903/930 |

(Continued)

FOREIGN PATENT DOCUMENTS

| | | | |
|---|---|---|---|
| DE | 10056553 | A1 | 5/2001 |
| DE | 102015111926 | A1 | 1/2017 |

(Continued)

OTHER PUBLICATIONS

International Search Report and Written Opinion for Application No. PCT/US21/65420, mailed Mar. 24, 2022, 14 pages.

(Continued)

*Primary Examiner* — William M McCalister

(74) *Attorney, Agent, or Firm* — Brooks Kushman P.C.

(57) ABSTRACT

A lift device and a method of controlling the lift device are provided. The lift device has an electric motor drivingly coupled to a traction device, and a traction battery. A hydraulic circuit has a pump with a pump motor, and a valve. In response to a voltage being above a threshold voltage while the electric motor is outputting a braking torque and providing electrical power to the battery, flow of the pump is increased and the valve is controlled to reduce a size of the valve opening and increase pressure in the pressure galley thereby reducing electrical power to the traction battery. The flow of the pump and the valve position are therefore controlled in response to a braking power output being greater than a threshold to dissipate braking power output into the hydraulic circuit and charge the traction battery with the remaining braking power output.

17 Claims, 5 Drawing Sheets

(56) References Cited

U.S. PATENT DOCUMENTS

| | | | | |
|---|---|---|---|---|
| 9,238,477 | B2 * | 1/2016 | Ahern | B66F 11/042 |
| 10,167,181 | B2 * | 1/2019 | Xu | B66F 9/07568 |
| 10,270,265 | B2 * | 4/2019 | Owen | B60L 3/04 |
| 10,611,204 | B1 * | 4/2020 | Zhang | B60G 17/016 |
| 11,447,020 | B2 * | 9/2022 | Lombardo | B60L 7/10 |
| 2004/0124020 | A1 * | 7/2004 | Leifert | B60L 7/22<br>180/65.1 |
| 2009/0008175 | A1 | 1/2009 | Donaldson | |
| 2010/0186404 | A1 | 7/2010 | Yasufuku et al. | |
| 2011/0198141 | A1 * | 8/2011 | Clark | B60K 17/356<br>180/65.265 |
| 2015/0210520 | A1 * | 7/2015 | Ahern | B66F 11/042<br>182/69.5 |
| 2015/0275798 | A1 | 10/2015 | Kato et al. | |
| 2017/0081162 | A1 * | 3/2017 | Ahern | B66F 11/042 |
| 2017/0314233 | A1 | 11/2017 | Egawa et al. | |
| 2018/0056790 | A1 | 3/2018 | Symanow et al. | |
| 2019/0193507 | A1 | 6/2019 | Kral et al. | |
| 2020/0239000 | A1 | 7/2020 | Chen et al. | |
| 2020/0317488 | A1 | 10/2020 | Bafile et al. | |
| 2021/0114464 | A1 | 4/2021 | Carbone et al. | |

FOREIGN PATENT DOCUMENTS

| | | | |
|---|---|---|---|
| EP | 2135838 | A1 | 12/2009 |
| EP | 2705977 | A2 | 3/2014 |
| EP | 3127855 | A1 | 2/2017 |
| EP | 3868700 | A1 | 8/2021 |
| JP | H0592769 | A | 4/1993 |
| JP | H08256401 | A | 10/1996 |
| JP | 2000038299 | A | 2/2000 |
| JP | 2001139295 | A | 5/2001 |
| JP | 2001146400 | A | 5/2001 |
| JP | 2004120999 | A | 4/2004 |
| JP | 2006273516 | A | 10/2006 |
| JP | 2008280178 | A | 11/2008 |
| JP | 2011016615 | A | 1/2011 |
| JP | 2014156307 | A | 8/2014 |
| JP | 2015063847 | A | 4/2015 |
| JP | 2016524892 | A | 6/2016 |
| JP | 2017178142 | A | 10/2017 |
| JP | 6794928 | B2 | 12/2020 |
| JP | 2021080788 | A | 5/2021 |
| WO | 2019119021 | A1 | 6/2019 |

OTHER PUBLICATIONS

International Search Report and Written Opinion for PCT Application No. PCT/US21/62316, dated Feb. 24, 2022, 9 pages.

International Preliminary Report on Patentability for Application No. PCT/US2021/062316, dated Mar. 28, 2024, 8 pages.

International Preliminary Report on Patentability for Application No. PCT/US2021/065420, dated Mar. 28, 2024, 12 pages.

Non-Final Office Action for U.S. Appl. No. 17/475,788, dated Mar. 5, 2025, 35 pages.

Japan Office Action and English translation for Application No. 2024-516562, dated Nov. 4, 2025, 10 pages.

Japan Office Action and English translation for Application No. 2024-516680, dated Nov. 11, 2025, 11 pages.

Extended European Search Report for Application No. EP21957705.3, dated Jul. 10, 2025, 11 pages.

Extended European Search Report for Application No. 21957706.1, dated Jul. 22, 2025, 9 pages.

EPO Communication, 3rd Party Observation for Application No. 21957705.3, dated Apr. 13, 2026, 9 pages.

* cited by examiner

LIFT DEVICE AND METHOD OF CONTROLLING

TECHNICAL FIELD

Various embodiments relate to a lift device or utility vehicle with an electric drivetrain and a hydraulic function manifold.

BACKGROUND

A lift device with an electric driveline may use regenerative braking from a traction motor to recharge a traction battery. A motor controller controls the traction motor, and is in communication with a traction battery. During braking conditions, the motor controller and/or battery voltage may rise above an associated limit. Conventionally, a lift device may be provided with a motor controller with a higher voltage threshold than what could occur with the associated traction battery and/or an oversized traction battery that does not experience significant voltage change with high charge rates; however, these components may add cost and weight to the device. Alternatively, the device may be provided with a resistive heater that is connected to the traction battery via a switch, and is operated when the voltage is high to discharge the battery and reduce the voltage. If the motor controller and/or battery voltage approaches or reaches the associated limit, the motor torque output is reduced; however, this is at the expense of braking torque, which may cause the vehicle speed to increase above the commanded speed, or may cause the parking brake to be abruptly set.

SUMMARY

In an embodiment, a lift device is provided with a chassis, a plurality of traction devices to support the chassis on an underlying surface, an electric motor drivingly coupled to at least one of the plurality of traction devices, a motor controller in electrical communication with the electric motor, and a traction battery in electrical communication with the electric motor via the motor controller. A hydraulic circuit has a pump, a pressure galley, a return line, and a valve controlling pressure in the pressure galley and fluidly connecting the pressure galley to the return line. A pump motor is drivingly connected to the pump and in electrical communication with the traction battery. A user input is provided to control a speed of the lift device. A controller is configured to, in response to a voltage being above a threshold voltage while the electric motor is outputting a braking torque and providing electrical power to the battery, increase a flow of the pump and control the valve to reduce a size of the valve opening and increase pressure in the pressure galley thereby reducing electrical power to the traction battery.

In another embodiment, a method of controlling a lift device is provided. The lift device is propelled via at least one electric motor connected to a wheel, with the at least one electric motor electrically connected to a traction battery via a motor controller. A hydraulic circuit is provided with a pump providing flow to a pressure galley, a valve fluidly connecting the pressure galley to a return line, and an actuator in fluid communication with the pressure galley and the return line. The pump is driven with a pump motor electrically connected to the traction battery. A braking power output for the at least one electric motor is determined to control the vehicle to a commanded speed based on an actual speed of the lift device and a load on the electric motors. A flow of the pump is increased and the valve is controlled to reduce a size of an opening of the valve in response to the braking power output being greater than a threshold to dissipate braking power output above the threshold into a hydraulic circuit and charge the traction battery with the remaining braking power output.

In an embodiment, a propulsion device is provided with an electric motor adapted to be drivingly coupled to at least one wheel, a motor controller in electrical communication with the electric motor, and a traction battery in electrical communication with the electric motor via the motor controller. A hydraulic circuit has a pump, a pressure galley, a return line, and a valve controlling pressure in the pressure galley and fluidly connecting the pressure galley to the return line. A pump motor is drivingly connected to the pump and in electrical communication with the traction battery. A user input controls a speed of the lift device. A controller is configured to, in response to a voltage being above a threshold voltage while the electric motor is outputting a braking torque and providing electrical power to the battery, increase a flow of the pump and/or control the valve to reduce a size of the valve opening and increase pressure in the pressure galley thereby reducing electrical power to the traction battery.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
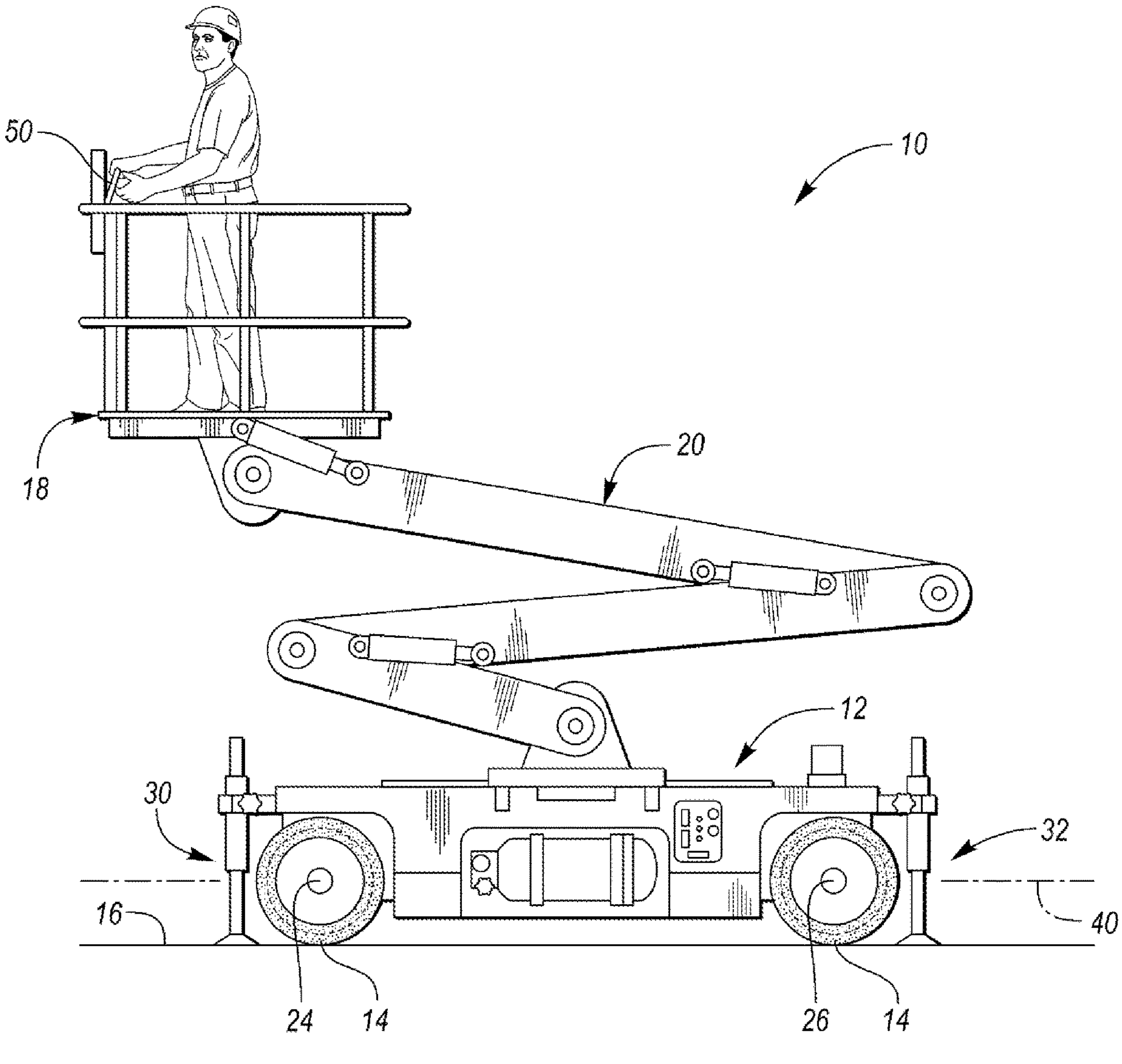
FIG. 1 illustrates a perspective view of a lift device according to a first embodiment.

FIG. 1 illustrates a lift device 10 or utility vehicle 10 according to a first embodiment and for use with the present disclosure. Lift devices or utility vehicles are used in a commercial or industrial environment and may include lift equipment, including a portable material lift, aerial work platform, telehandler, scissor lift, rough terrain telescopic load handler, and telescopic and articulating boom. In FIG. 1, the lift device 10 is illustrated as a telescopic and articulating boom according to a non-limiting example.

The lift device 10 has an electric propulsion system that acts to propel the vehicle, as described below with respect to FIG. 3. The lift device 10 also has an electrically or hybrid powered hydraulic system that operates the work function, such as a lift platform, of the lift device as well as other vehicle systems such as steering, and is described below with respect to FIG. 4.

The lift device 10 has a base 12 or a chassis 12 that is supported above underlying terrain by a plurality of traction devices 14, such as four wheels 14. The lift device 10 is configured for lifting a load, such as a person, tools, cargo, and the like, with respect to a support surface 16 or the underlying terrain, such as paved or unpaved ground, a road, an apron such as a sidewalk or parking lot, an interior or exterior floor of a structure, or other surfaces.

The lift device 10 includes a vehicle lift component 18 such as a platform, a base or chassis 12, and a support assembly 20 that couples the platform 18 and the base 12. The base 12 is supported on the support surface 16 by traction devices 14, such as wheels. The traction devices 14 may include tires and/or tracks. The vehicle 10 has a first axle 24 with two wheels 14 and a second axle 26 with another two wheels 14. Axle 24 may be a front axle, and axle 26 may be a rear axle. In other embodiments, the vehicle 10 may have more than two axles. In other embodiments, traction devices 14 may be aligned with one another along a lateral axis of the vehicle, but not have axles 24, 26 extending between them.

The support assembly 20 may include one or more hydraulic actuators, as described below, along with other structural members, to provide a lifting mechanism for the platform 18.

The base 12 has first and second opposite sides or ends 30, 32 that correspond to the front and the rear ends of the base and vehicle, respectively. The vehicle 10 is configured to move in both a forward and a reverse direction, e.g., in either direction along a vehicle longitudinal axis 40 depending on the direction that the wheels 22 are rotating.

The operator for the lift device 10 inputs commands to the lift device via an operator input or user input 50, e.g., on a control panel. The operator input 50 may include a joystick to input speed and direction commands for the lift device 10. For example, forward movement of the joystick relative to its neutral, center position provide a forward speed command for the vehicle, e.g., the vehicle moves in a forward direction, or to the left in FIG. 1, at a selected speed. Reverse movement of the joystick relative to its neutral center position provides a reverse speed command for the vehicle, e.g., the vehicle moves in a rearward or reverse direction, or the right in FIG. 1, at a selected speed. The magnitude of the speed command is based on the distance between the actual joystick position and the neutral central position.

The control panel 50 may additionally have an operator input for selection of a speed mode for the device 10. In one example, the lift device 10 has three speed modes, with each speed mode having a different maximum speed for the lift device. The first speed mode has the highest maximum speed and is used when the lifting platform is stowed, the second speed mode has a lower maximum speed mode and is also used when the lifting platform is stowed, and the third speed mode has the lowest maximum speed and is used when the lifting platform is deployed from the stowed position. The joystick may be recalibrated based on the mode, such that the full forward position of the joystick provides the maximum speed allowed for that mode, and likewise for the full back or rear position.

In one example, the first speed mode allows for vehicle 10 speeds ranging from zero to twenty miles per hour in either direction, the second speed mode allows for vehicle speeds ranging from zero to five miles per hour in either direction, and the third speed mode allows for vehicle speeds ranging from zero to two miles per hour in either direction. In another example, the first speed mode allows for vehicle 10 speeds ranging from zero to four miles per hour in either direction, the second speed mode allows for vehicle speeds ranging from zero to two miles per hour in either direction, and the third speed mode allows for vehicle speeds ranging from zero to less than one miles per hour in either direction.

The system controller may additionally select the speed mode for the device based on the operating conditions, and may override the operator selection via input 50.

The control panel 50 also provides for other operator inputs, such as controlling the position of the lift component 18 relative to the base 12. Furthermore, the control panel 50 may include a display screen, indicator lights, and the like to provide information to the operator regarding the lift device 10.

Figure 2:
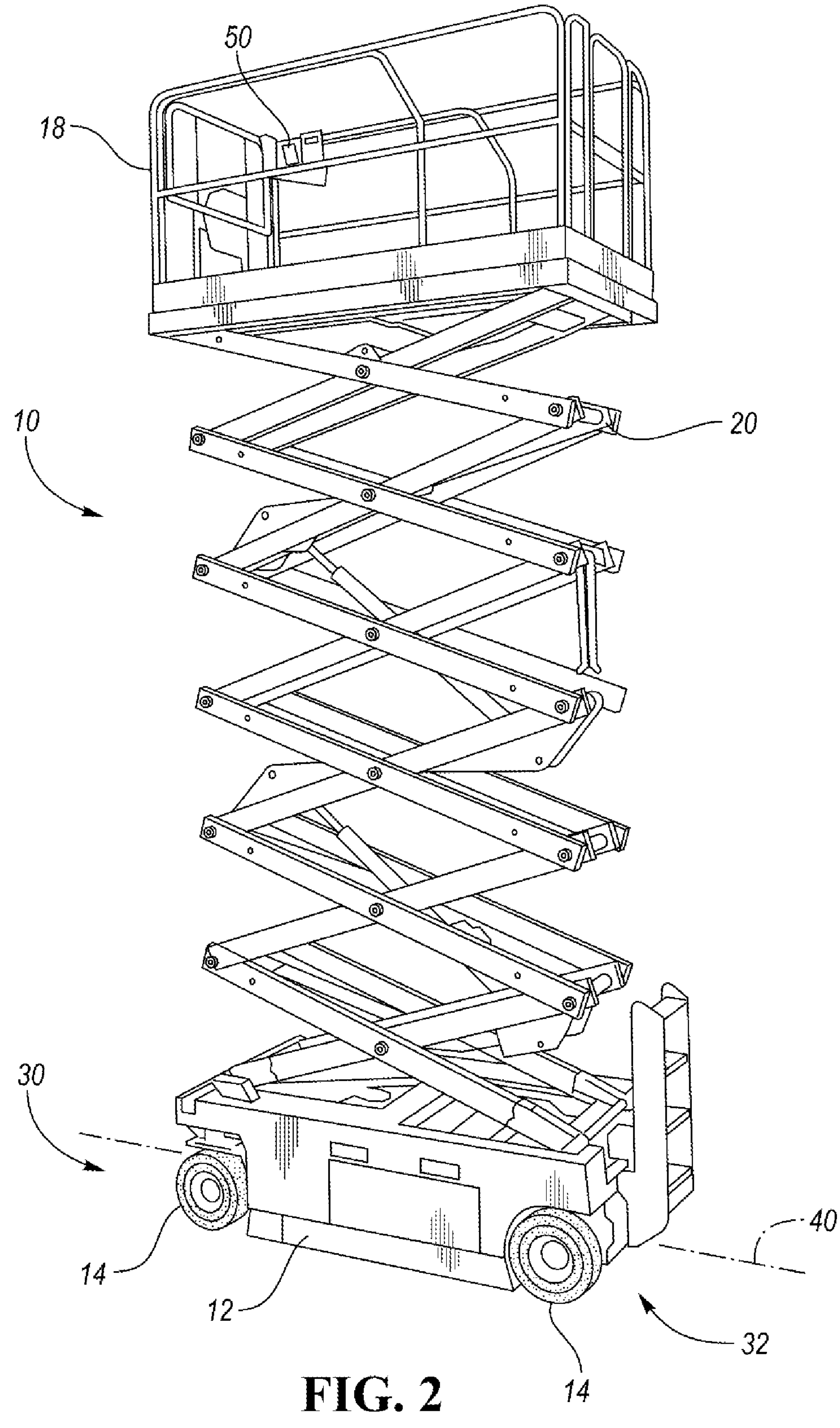
FIG. 2 illustrates a perspective view of a lift device according to a second embodiment.

FIG. 2 illustrates a lift device 10 according to another embodiment and for use with the present disclosure. Elements that are the same as or similar to those described above with respect to FIG. 1 are given the same reference number for simplicity. In FIG. 2, the lift device 10 is illustrated as a scissor lift according to another non-limiting example.

Figure 3:
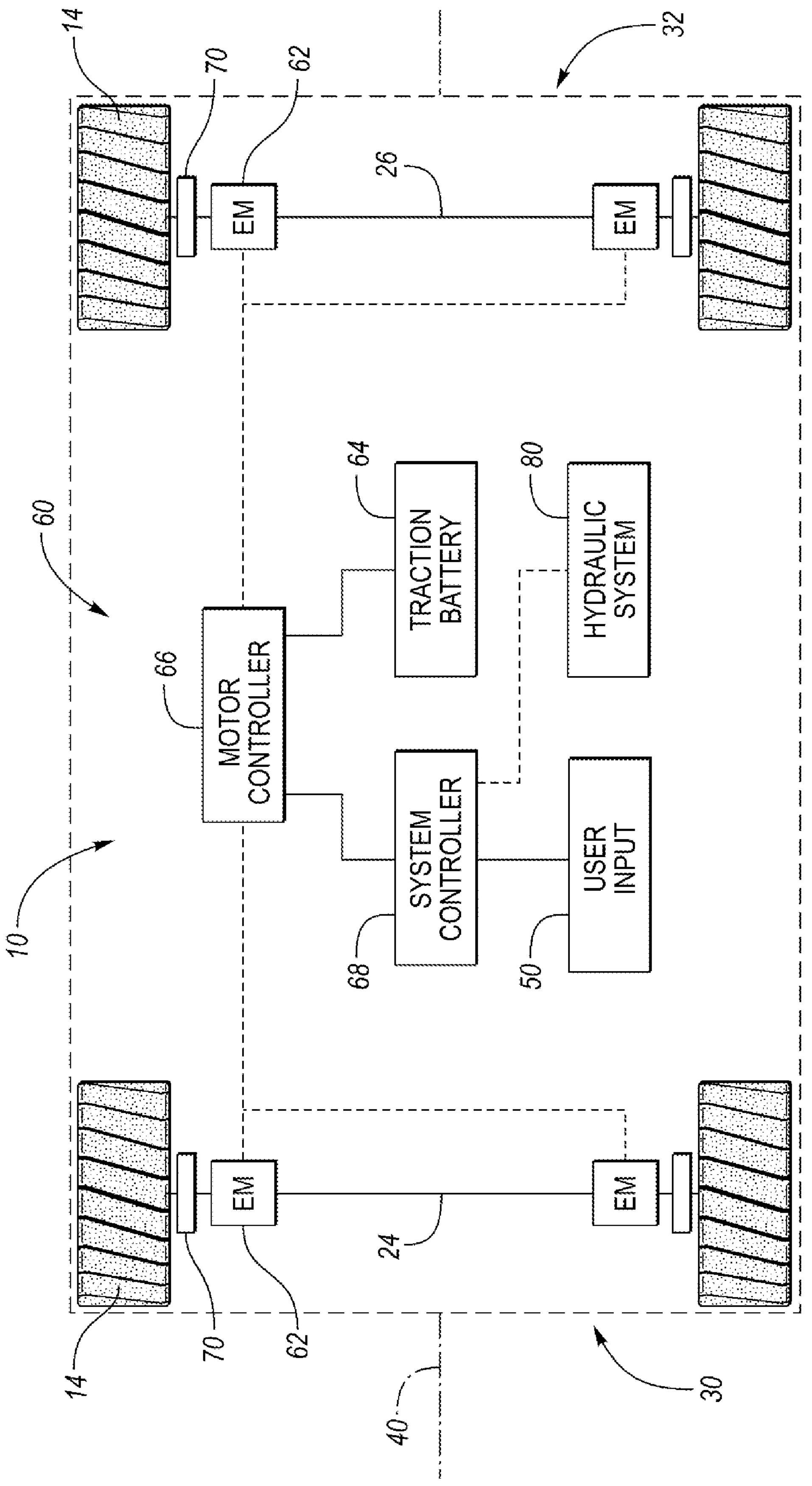
FIG. 3 illustrates a schematic for the lift device of FIG. 1 or FIG. 2.

FIG. 3 illustrates a schematic for the lift device 10 of FIG. 1 or FIG. 2, or another lift device such as a forklift, or the like. Elements that are the same as or similar to those described above with respect to FIG. 1 are given the same reference number for simplicity.

The lift device 10 has a plurality of traction devices 14. In one example, the traction devices 14 are provided by wheels, and the lift device 10 has four wheels as shown above with respect to FIGS. 1 and 2. In other examples, the lift device 10 may have more than four wheels.

The lift device 10 has an electric propulsion system 60. The electric propulsion system 60 includes one or more electric motors 62 that are drivingly connected to at least one of the plurality of traction devices 14 to propel the lift device over underlying terrain. In one example, the electric motors 62 are provided as hub motors for two or more of the wheels 14. In a further example, and as shown, the electric propulsion system 60 has four electric motors 62 that are provided as hub motors for the four wheels 14. In other examples, the electric motors 62 may be connected to more than one wheel, e.g., via a differential in a driveline. Alternatively, only some of the wheels 14 provide tractive force for the vehicle, e.g., as two wheel drive.

Each electric motor 62 is connected to a traction battery 64 via an associated motor controller 66. The motor controller 66 controls the speed and torque of each of the electric motors 62, and the motors 62 may be independently controlled. The motor controller 66 is shown as a single integrated element, but may be provided as a separate element for each motor 62. The motor controller 66 voltage may be equivalent to the voltage of the traction battery 64. The motor controller 66 has an associated voltage limit. Each of the motor controllers 66 are in communication with a system controller 68. The control panel 50 and operator inputs, such as the joystick, are also in communication with the system controller 68.

The traction battery 64 may be provided by one or more cells, may be a wet cell or a dry cell, and may be formed with a lead acid chemistry, lithium based chemistry, or another chemistry. The traction battery 64 may have an associated voltage limit, current limit, state of charge limit, or temperature limit. In one non-limiting example, the motor controller 66 has a voltage limit. In another example, and with a lithium chemistry battery, the battery 64 may have voltage and current limits, as well as operating temperature limitations. For example, the battery 64 may have limited charging when it is outside a temperature range, e.g., after a cold start at cold ambient temperatures, and the motor controller 66 and/or system controller 68 may limit charging of the battery in these conditions.

The system controller 68 is in communication with the various propulsion and hydraulic components and sensors to control the device 10. The controller 68 may provide or be a part of a vehicle systems controller (VSC), and may include any number of controllers, and may be integrated into a single controller, or have various modules. Some or all of the controllers may be connected by a controller area network (CAN) or other system. The controller may also be connected to random access memory or another data storage system.

The motor controller 66 may control the electric motor 62 on a speed control feedback loop based on the speed input from the operator. For example, the operator may input a selected speed via the joystick 50, and the motor controller 66 may control or modulate torque of the electric motor 62 to provide the desired speed output based on the operator request. Therefore, to reduce a speed of the traction motor 62, the motor controller 66 may command the traction motor to output a reduced torque or a torque of the opposite direction to the motor rotation, e.g., as a braking torque. The traction motors 62 may be provided as four quadrant motors that are controllable between forward braking, forward motoring, reverse motoring, and reverse braking.

Additionally, the traction battery 64 may be externally charged, e.g., via an electrical input from an external power source such as a charging station.

Each electric motor 62 may be controlled to rotate in a first direction and in a second direction, and additionally has the speed and torque outputs controlled. The electric motor 62 may therefore propel the vehicle across the underlying terrain with a positive torque output. The electric motors 62 may additionally act as a generator to provide a negative torque output to brake or slow the vehicle, and provide electrical power to the traction battery 64.

In the example shown, the lift device 10 is provided without a service braking system. As such, the electric motors 62 are the only devices that apply a braking force to the wheels 14 to control vehicle speed while driving. A service braking system is conventionally provided by drum brakes, disc brakes, or the like that provide for a controlled braking input by an operator, e.g., to slow the vehicle to a lower speed.

In the example shown, the lift device 10 has a parking brake system. In the parking brake system, a parking brake 70 is provided at each wheel 14. In one non-limiting example, the parking brake 70 is integrated into the traction motor 62 and wheel 14 drive assembly, and may be provided as a spring applied, coil released brake, e.g. as a disc brake. The controller 68 or operator may actuate the parking brakes 70 to stop the lift device 10, or release the parking brakes 70 to allow the lift device 10 to move relative to the underlying terrain. When the parking brakes 70 are actuated or set when the device 10 is in motion, the wheels 14 do not rotate, and the lift device 10 skids to a stop.

On the electrical propulsion lift device 10 as described above with respect to FIGS. 1-3, the traction motors 62 may provide both propulsion torque and braking torque in both forward and reverse directions. When these motors 62 are moving the device forward using positive torque, the traction battery 64 is discharged to provide the electrical power. When these traction motors 62 are slowing the vehicle down by braking, the battery current direction is reversed and the braking power charges the battery 64, e.g., via regenerative braking.

Figure 5:
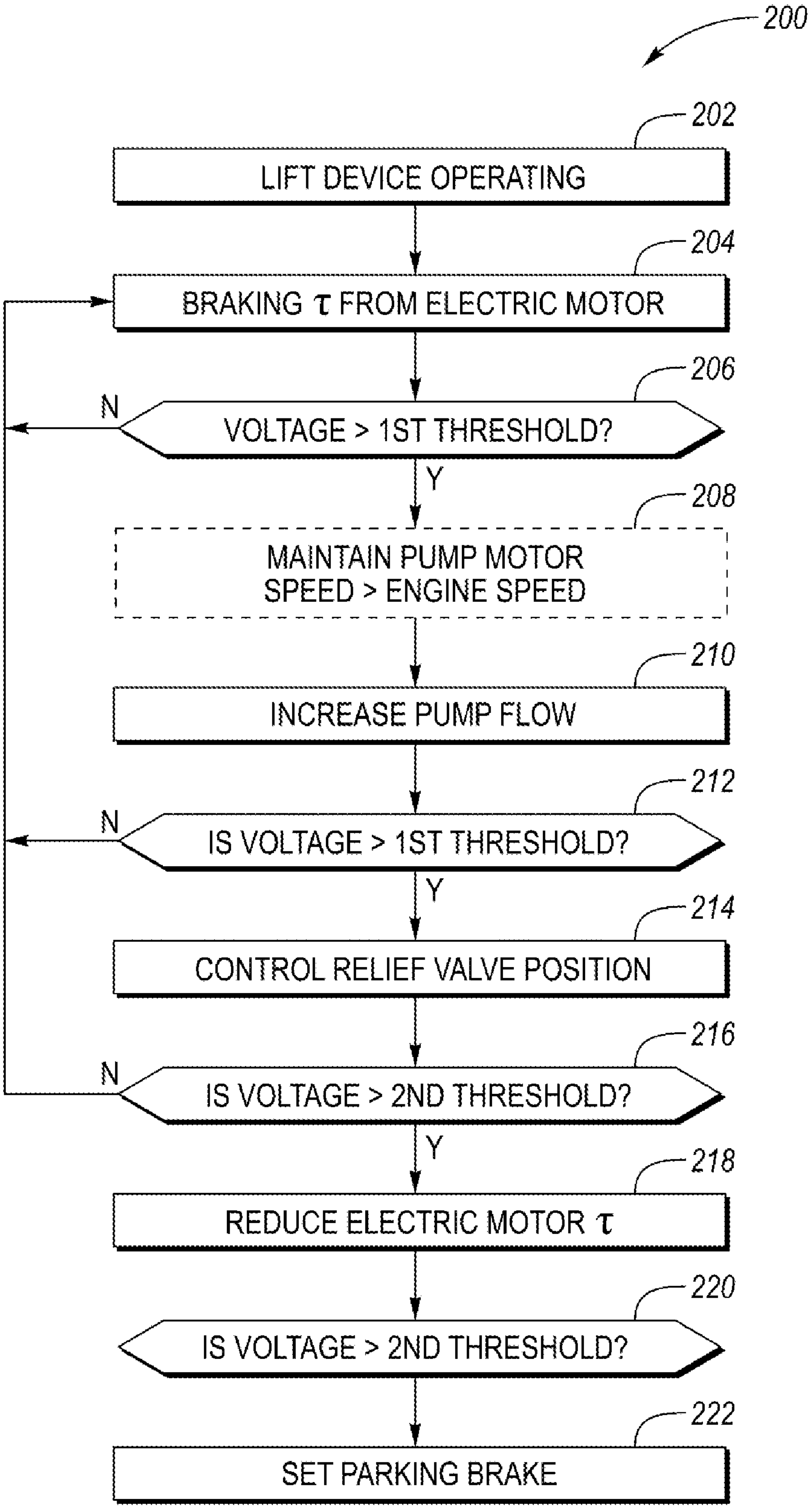
FIG. 5 illustrate a flow chart for a method according to an embodiment, and for use with the lift device of FIG. 1 or 2.

Charging, e.g., via regenerative braking, results in increased voltage at the traction battery 64. Depending on the size and chemistry of the battery 64 as well as the braking power applied, the battery 64 voltage may rise significantly. Although this voltage increase may be temporary, the motor controller 66, the traction battery 64, and/or other on-board power electronics devices may have associated voltage limits or current limits. For example, a three-phase motor controller 66 may have an associated voltage threshold, and the motor 62 torque under braking may be limited when this threshold is reached. This, in turn, may limit the ability of the traction motor 62 to brake and control vehicle 10 speed, e.g., on grade, which may result in unintended acceleration downslope for the device 10 and/or a lift device speed above the commanded speed. The method as described below with respect to FIG. 5 provides for control of the lift device 10 during such a scenario.

Figure 4:
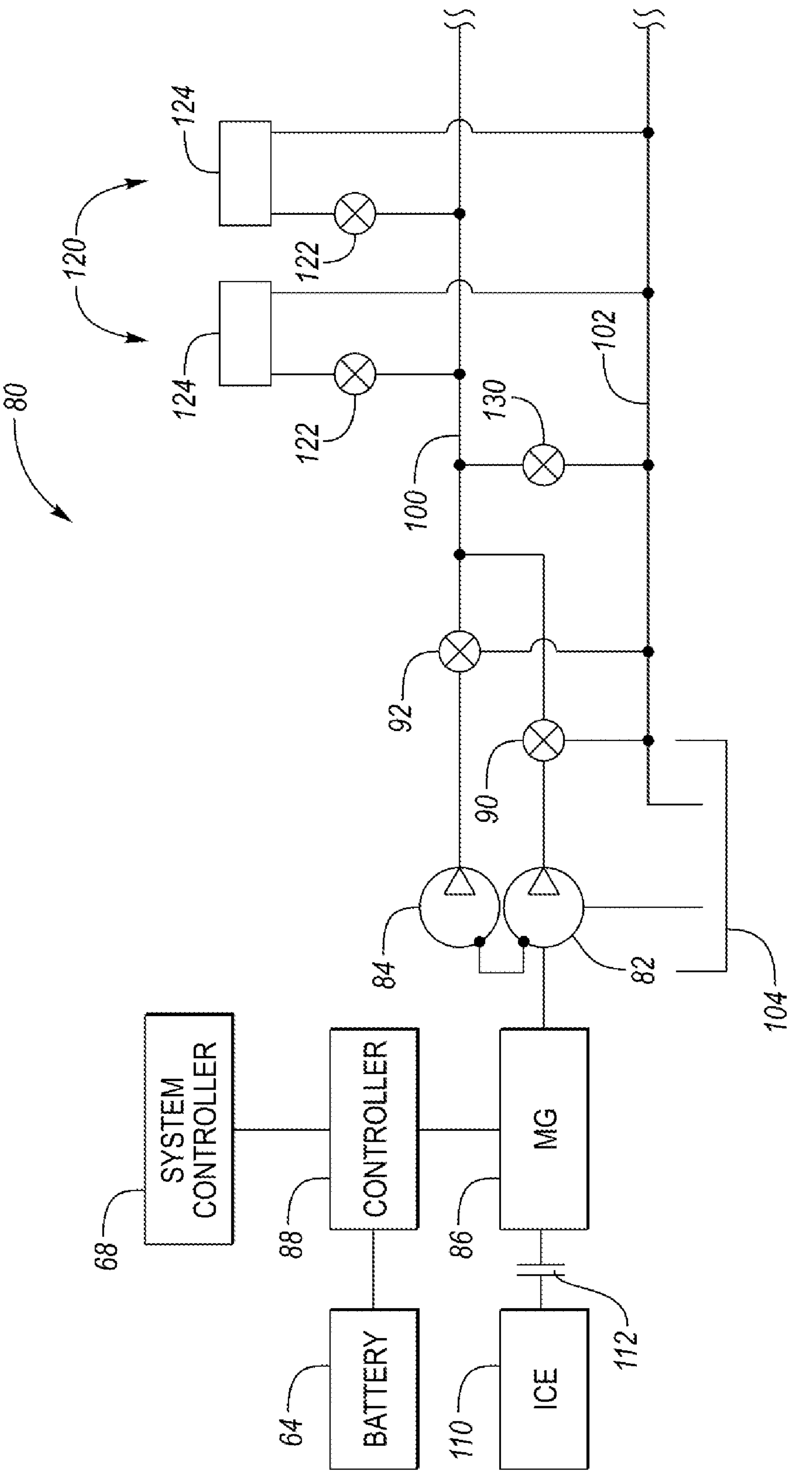
FIG. 4 illustrates a hydraulic schematic for the lift device of FIG. 1 or FIG. 2.

FIG. 4 illustrates a hydraulic schematic for the lift device of FIG. 1 or FIG. 2. The hydraulic system 80 may be a hydraulic circuit with a closed loop system or an open loop system. In the example shown, the hydraulic system has two pumps 82, 84, with the second pump 84 piggybacked to the first pump 82. Alternatively, a single pump housing may be provided with the housing sectioned two provide two pump 82, 84 volumes. The first and second pumps 82, 84 are driven by a pump motor 86, which is an electric motor that is electrically coupled to the traction battery 64 described above with reference to FIG. 3 via a pump motor controller 88. The speed of the pump motor 86 may be controlled to control the flow from the pumps 82, 84. As used herein, flow from the pumps 82, 84 may be controlled by controlling a speed of the pumps and/or a displacement from the pumps or via the pump valves 90, 92.

In alternative examples, the hydraulic system may have a single pump, such as pump 82, that is driven by the pump motor.

The pumps 82, 84 may be provided as variable displacement pumps. Alternatively, and as shown, each pump 82, 84 may have an associated pump valve 90, 92 that fluidly connects the associated pump to the pressure galley 100 or to the return line 102 and tank 104. Therefore, displacement or flow to the pressure galley 100 may be controlled by selectively controlling the first and/or second pump valves 90, 92 to provide flow to the pressure galley 100. Displacement or flow to the pressure galley 100 may be further controlled within a range provided by the pump valves 90, 92 in selected positions by selectively controlling the speed of the pump motor 86.

In various examples, and as shown, the hydraulic system 80 additionally has an internal combustion engine 110, such as a diesel engine or gasoline engine that is coupled to the pump motor 86 via an overrunning clutch 112. The pump motor 86 is therefore positioned between the engine 110 and the pumps 82, 84. The engine 110 and/or the pump motor 86 may be operated to drive the pumps 82, 84. The overrunning clutch 112 engages to mechanically couple the engine 110 and the pump motor 86 to one another when the rotational speed of the engine 110 output shaft is equal to or less that the rotational speed of the pump motor 86 shaft. Therefore, the overrunning clutch 112 is disengaged, and the pump motor 86 operates independently of the engine 110 when the pump motor speed is greater than the engine speed.

In other examples, the hydraulic system 80 may be only electrically powered, such that there is no engine or overrunning clutch, and only the pump motor 86 rotates the pump(s).

The engine 110, pump motor controller 88, and selected valves are also in communication with the vehicle controller 68.

The first and second pumps 82, 84 provide pressurized fluid flow to a pressure galley 100. The hydraulic functions 120 for the lift device 10 are connected to the pressure galley 100 to receive pressurized fluid therefrom, e.g., via valves 122. For example, hydraulic actuators 124 for the support assembly of the lift platform, steering of the wheels, axle control, and other device functions are fluidly coupled to the pressure galley 100. The hydraulic actuators 124 are also coupled to a return line 102, which is downstream of the pressure galley 100 and actuators 124. The return line 102 provides a fluid pathway to the tank 104 and the pumps 82, 84 from the pressure galley 100 and the actuators 124. Although only two hydraulic actuators 124 are shown, any number of hydraulic actuators are contemplated for use with the hydraulic system 80.

A valve 130, such as a relief valve, is positioned between the pressure galley 100 and the return line 102 to directly fluidly connect the pressure galley to the return line. The valve 130 may be variable position valve, e.g., as a proportional relief valve or an inverse proportional relief valve. In other examples, the valve 130 may be a fixed relief valve. The valve 130 position may be controlled via a solenoid in communication with the system controller 68. The valve 130 position may be controlled to control the pressure within the pressure galley 100. When the valve 130 is open, the flow from the pumps 82, 84 and the pressure galley 100 flows to the return line 102 and bypasses the actuators 124, and the pressure in the pressure galley 100 is minimized. When the valve 130 is closed, all of the flow is directed from the pumps 82, 84 to the pressure galley 100, to maximize pressure in the pressure galley 100. The position of the valve 130 may be controlled or modulated between open and closed positions, and partially open positions, to control the pressure within the pressure galley 100.

The hydraulic system 80 may have other components that are not shown, including other valves, actuators, filters, and the like.

The hydraulic system 80 may be used to consume electrical power from the battery 64 while the lift device 10 is braking via the electric motors 62 and when the voltage or other limits associated with the motor controller 66 or traction battery 64 are approaching their thresholds or limits according to the present disclosure. As the flow from the pumps 82, 84 increases and/or pressure in the system 80 increases, electrical power consumption by the hydraulic system 80 is also increased. For example, when high pressure fluid is metered through the relief valve 130, the power is dissipated as heat into the fluid. As the present disclosure provides for control over the speed and/or displacement of the pumps 82, 84, as well as control over the valve 130 position, the amount of electrical power dissipated by the hydraulic system 80 may be controlled as described below with respect to FIG. 5 to maintain operation of the lift device 10 within electrical limits and charging the traction battery 64 to the extent that it may be charged.

FIG. 5 illustrates a method 200 for controlling a lift device, such as the lift device 10 shown above with respect to FIGS. 1-4. In various examples, steps in the method 200 may be performed in a different order, performed in parallel or in series, and/or added or omitted.

Various embodiments of the method 200 have associated, non-limiting advantages. For example, the method 200 and the device 10 control the speed of the vehicle by dumping or transferring energy into the hydraulic system 80 when a parameter associated with regenerative braking by the traction motors 62 is above a threshold to prevent or delay engagement of the parking brake 70 and an abrupt stop for the device 10, especially at higher speeds.

As described above, during braking by the traction motors 62, and especially during braking while descending a grade, the electric traction motors 62 behave like generators, turning wheel torque and velocity into electrical power. At higher speeds, steeper grades and rapid decelerations for the lift device 10, the braking power generated by the traction motors 62 may be greater than a threshold or limit associated with the battery 64, motor controller 66, or another electrical component. This threshold may be more easily reached during braking when the traction battery 64 is near or at full charged and/or cold. When braking power is applied to the traction battery 64 via regenerative braking, the traction battery 64 voltage may rise quickly. The motor controller 66 may limit regenerative braking when the traction battery 64 voltage is near a threshold to protect the battery 64 and/or the motor controller 66, and therefore braking via electric motors 62 may be limited under certain circumstances for the lift device 10. Likewise, when the device 10 has a lithium chemistry traction battery 64, the battery may have associated current and/or voltage thresholds. As the lift device 10 is without service braking, the controller 68 would need to set the parking brake 70, which provides for a sudden stop for the device, as well as impacts drivability. The hydraulic system 80 is used as described herein to dissipate excess braking power generated by the traction motors 62, and allow for extended regenerative braking when the device 10 is approaching the electrical thresholds for the motor controller 66, traction battery 64, and other power electronic components.

At steps 202, 204, the method 200 determines whether the lift device 10 is operating, and if so, if the electric motors 62 are generating braking torque and providing electrical power to the traction battery 64. For example, the electric motors 62 may be generating braking torque based on a request from the operator to reduce vehicle speed, or to maintain vehicle speed while descending a grade or slope. The controller 68 may be configured to command the electric motor 62 to output a braking torque in response to receiving a signal from the user input to reduce a speed of the lift device 10, or maintain a speed of the lift device 10 on a down slope or grade, or the like.

At step 206, the system controller 68 compares the voltage to a first threshold voltage. The system controller 68 may compare the voltage in the motor controller to the first threshold voltage in one example. The first threshold voltage may be set below a voltage limit associated with the motor controller 66. In one non-limiting example, the motor controller 66 voltage limit is 63 volts, the first threshold voltage is set at 55 volts, and nominal voltage is 48 volts. In other examples, other threshold voltages may be set, or the system controller 68 may monitor the voltage of another power electronics device in the device 10.

For example, when motor torque output or braking occurs and when the battery is already partially or nearly fully charged, the motor 62 controller and battery 64 voltage rises. The control system 68 senses the rise in voltage and sets the pressure in the pressure galley 100 to a nominal value and turns the pumps 82, 84 to a nominal flow setting in preparation for reacting to the braking, for example, if the hydraulic system 80 is not already operating.

Therefore, for a hydraulic system 80 without an internal combustion engine 110, the pump 82, 84 speed may be set at a low value within its operating range.

At step 208, and if the lift device 10 is provided with an internal combustion engine 110 in the hydraulic system 80, the controller 68 is further configured to, in response to the voltage in the motor controller 66 being above the first threshold voltage, control a speed of the pump motor 86 to be greater than the speed of the engine 110 when the engine is operating, and the electric motor 62 is outputting the braking torque. This maintains the overrunning clutch 112 in an open or disengaged position, and prevents the engine 110 from putting a load onto or slowing the pump motor 86.

Therefore, for a hydraulic system 80 with an internal combustion engine 110, and when the engine is running, the pump 82, 84 or pump motor 86 speed is set to a value that is higher than the engine 110 speed such that the over-running clutch permits the pump motor to spin faster than the engine 110, and begin discharging the battery 64 rather than charging the battery.

At step 210, if the voltage exceeds the first threshold, the system controller 68 increases a flow of the pumps 82, 84 in the hydraulic system 80. By increasing flow of the pumps 82, 84, the pump motor 86 consumes electrical power from the traction battery 64, which in turn reduces electrical power to the traction battery 64 from the traction motors 62. The voltage therefore will be reduced. The controller 68 may be further configured to increase the flow of the pumps 82, 84 if the flow is below a predetermined threshold, and until the flow reaches the predetermined threshold.

At step 212, the system controller compares the voltage to the first threshold voltage, and if the voltage still exceeds the first threshold, proceeds to step 214, wherein the system controller 68 controls the relief valve 130 to reduce a size of the valve opening and increase pressure in the pressure galley 100. This also reduces electrical power to the traction battery 64 as providing the higher pressure in the pressure galley 100 and dissipating the energy as heat across the relief valve 130 also consumes electrical power from the traction battery 64, which in turn reduces electrical power to the traction battery 64 from the traction motors 62.

Note that in one example, steps 210 and 214 are performed in sequential order as shown in the flow chart, and the controller 68 is configured to control the valve 130 to reduce the size of the valve opening in response to the flow of the pumps 82, 84 reaching the predetermined threshold. The controller 68 therefore controls the pumps 82, 84 to their flow threshold before controlling the valve 130 to the pressure threshold.

In another example, steps 210 and 214 are performed in other orders. For example, the controller 68 is further configured to increase the flow of the pumps 82, 84 if the flow is below a predetermined flow threshold while controlling the valve 130 to reduce the size of the valve opening and increase the pressure in the pressure galley 100 if the pressure is below a predetermined pressure threshold to discharge the battery 64. The pumps 82, 84 flow and the valve 130 position may therefore be controlled concurrently as long as both are below their associated thresholds.

In another example, the controller 68 is further configured to control the valve 130 to reduce the size of the valve opening and increase the pressure in the pressure galley 100 until the pressure reaches a predetermined pressure threshold to discharge the battery 64, and increase the flow of the pumps 82, 84 in response to the pressure in the pressure galley 100 reaching the predetermined pressure threshold to discharge the battery 64. The controller 68 therefore controls the valve 130 to the pressure threshold before controlling the pumps 82, 84 to the flow threshold.

The controller 68 may control the flow of the pumps 82, 84 to be dependent on or a function of the voltage in the motor controller 66 and the first threshold voltage. In one example, the controller 68 controls the flow of the pumps 82, 84 to be proportional to a difference between the voltage in the motor controller 66 and the first threshold when the voltage is greater than the first threshold. As the voltage becomes increasingly greater than the first threshold, the flow output of the pumps 82, 84 likewise increases, thereby consuming more electrical or braking power to try and bring the motor controller 66 voltage back to the first threshold.

The controller 68 may control the size of the valve 130 opening to be dependent on or a function of the voltage in the motor controller 66 and the first threshold voltage. In one example, the controller 68 controls the size of the valve 130 opening to be proportional to a difference between the voltage in the motor controller 66 and the first threshold when the voltage is greater than the first threshold. As the voltage becomes increasingly greater than the first threshold, the size of the valve 130 opening is likewise reduced, thereby consuming more electrical or braking power to try and bring the motor controller 66 voltage back to the first threshold.

Alternatively, or additionally, steps 210 and 214 may be performed in response to the controller determining at step 206 that a temperature of the traction battery 64 is outside a predetermined range and/or in response to a voltage of the traction battery 64 being above a predetermined battery threshold.

Note that during steps 210 and 214, the traction battery 64 may be charged via electrical power from the motor controller 66 while the voltage in the motor controller 66 is above the threshold voltage and the electric motor 62 is outputting the braking torque to the extent that the battery 64 is below a maximum state of charge.

Furthermore, and for a hydraulic system 80 with more than one pump, the controller 68 may control the flow output of one or both of the pumps 82, 84. In one example, the controller 68 is further configured to, increase the flow of the pumps 82, 84 by: closing the first pump valve 90 and opening the second pump valve 92 in response to the device speed being below a first speed, opening the first pump valve 90 and closing the second pump valve 92 in response to the device speed being above the first speed and below a second speed, closing the first and second pump valves 90, 92 such that flow from the first and second pumps 82, 84 is directed to the pressure galley 100 in response to the speed being above the second speed, and increasing the pump motor 86 speed if the first and second pump valves 90, 92 are open and if the speed is below a predetermined pump speed to discharge the battery 64.

Therefore, the hydraulic system 80 operates in parallel to the traction motor control and regenerative braking system. When the system controller 68 detects voltage or current above the first threshold, it initiates a discharge from the traction battery 64 by using the battery powered pump motor 86 to pump hydraulic fluid through the relief valve 130 at high flow, proportional to the excess voltage or current measured by the controller 66. This creates a power draw or discharge from the traction battery 64, and allows the traction motors 62 and motor controllers 66 to continue to generate braking torque and replace current that is discharging to the hydraulic system 80.

The system controller 68 may apply proportional integral (PI) feedback control loops for setting the pumps 82, 84 flow and/or the valve 130 opening position. In one example, the feedback variable is the measured battery 64 voltage. The measured voltage is compared to the first threshold. Measured battery 64 voltage above the first threshold results in an error equal to the measured battery 64 voltage minus the voltage threshold. A positive error is then used by the feedback loop to increase the pumps 82, 84 flow (e.g., pump motor 86 speed and/or displacement) and/or the relief valve 130 position. The control feedback loop may use inputs including: the lift device 10 drive speed, and the battery 64 voltage. The control feedback loop may provide control outputs including: valve positions for the first and second pump valves 90, 92, pump motor 86 speed, and relief valve 130 position. The pump valves 90, 92 and relief valve 130 may be controlled by controlling a current to a coil or solenoid associated with each of the valves.

The lift device 10 therefore operates with two linked PI controls for flow and valve position. In the example shown, the flow control is prioritized, with the pressure control held fixed until the flow is maximized. In other examples, the pressure control may be prioritized, or the two controls may be implemented concurrently or simultaneously.

As the difference between the battery 64 voltage and the first threshold increases, the controller 68 applies the control feedback loop to increase the pump motor 86 speed and/or displacement using the PI control so that the pump motor 86 accelerates rapidly with increasing voltage. This increase in speed and hydraulic flow proportionally increases the power that is dissipated by the relief valve 130. If the difference between the battery 64 voltage and the first threshold drives the pump motor 86 speed to flow threshold, the controller 68 maintains the pump motor 86 speed at the flow threshold, and implements a second PI control loop that increases the pressure in the pressure galley 100 of the hydraulic system according to the voltage error, and via control over the size of the opening of the relief valve 130. As the cross-sectional area of the relief valve 130 decreases, the pressure in the pressure galley 100 increases. The pressure may be increased up to a pressure threshold allowed by the relief valve 130.

Operating the hydraulic system 80 in this way requires a discharge from the battery 64. This discharge offsets the charge being produced by the braking motors 62 during regenerative braking, so that in effect the braking power is converted to heat in the hydraulic fluid. Since the charge current is offset by the discharge current, the battery 64 voltage is brought back below the first threshold allowing the motors 62 to continue to brake up to the maximum torque output of the traction motor.

As only a portion of the braking power is dissipated in the hydraulic system 80 as is needed to limit the voltage, the remaining braking power may be used to charge the battery 64.

A similar control feedback loop may be applied by the system controller 68 to control excess current, or to limit charge current based on a battery 64 temperature, e.g., for a cold lithium chemistry battery.

In other examples, other feedback loops may be used to control the hydraulic system 80.

In further examples, the controller 68 may alternatively control the flow of the pumps 82, 84 and/or the relief valve 130 position to be dependent on or a function of a lift device 10 speed input. In one example, the system controller 68 applies a PI feedback loop that uses a difference between a speed commanded for the lift device by the joystick 50 and the actual speed. When the actual vehicle or lift device speed exceeds the speed commanded by the user, the hydraulic power is increased by increasing the flow of the hydraulic pumps 82, 84 and increasing the pressure in the pressure galley 100, either simultaneously or sequentially as described above. The amount of the hydraulic power increase is controlled by the PI gains.

If the voltage remains above the first threshold after steps 210, 214, the method proceeds to step 216 and compares the voltage to a second threshold. The second threshold voltage is greater than the first threshold voltage, and various non-limiting examples is 60 volts, or the same as the voltage limit, e.g., 63 volts as described above.

At step 218, the controller 68 is further configured to reduce the braking torque output from the electric motor 62 in response to the voltage in the motor controller 66 being above the second threshold voltage. The system controller 68 may apply a voltage control feedback loop for the motor controller 66 when the voltage is above the second threshold. For example, the feedback loop may input a battery 64 voltage, determine an overvoltage number based on the amount that the battery 64 voltage is above the second threshold, and reduce the motor 62 output torque based on the overvoltage number.

At step 222, the controller is configured to command the parking brake 70 to engage to stop the lift device in response to the voltage in the motor controller 66 being above the second threshold value at step 220 and if the speed of the lift device 10 is increasing.

Therefore, the method 200 determines a braking power output for the electric motor 62 to control the vehicle to a commanded speed based on an actual speed of the lift device 10 and a load on the electric motors 62. The method 200 then increases a flow of the pumps 82, 84 and controls the valve 130 to reduce a size of an opening of the valve in response to the braking power output being greater than a threshold to dissipate braking power output above the threshold into a hydraulic circuit 80 and charge the traction battery 64 with the remaining braking power output. The threshold may be associated with a traction battery 64 and/or the motor controller 66, and in one example is a voltage threshold or current threshold as is described above.

The present disclosure therefore allows varying both the pumps 82, 84 flow and the relief valve 130 pressure to give a wide range of discharge power to allow for continued regenerative braking near electrical limits for the lift device 10. Note that hydraulic power is a function of pressure and flow. As both flow and pressure are controlled in the hydraulic system 80, the hydraulic power may be controlled and set based on the motor 62 power output and motor controller 66 voltage and/or battery 64 current, regardless of the vehicle 10 speed or the grade. A portion of the braking energy may still be charging the traction battery 64 for use later.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lift device comprising:

a chassis;

a plurality of traction devices to support the chassis on an underlying surface;

an electric motor drivingly coupled to at least one of the plurality of traction devices;

a motor controller in electrical communication with the electric motor;

a traction battery in electrical communication with the electric motor via the motor controller; and a hydraulic circuit with a pump, a pressure galley, a return line, and a valve controlling pressure in the pressure galley and fluidly connecting the pressure galley to the return line;

a pump motor drivingly connected to the pump and in electrical communication with the traction battery;

a user input to control a speed of the lift device; and a controller configured to, in response to a voltage being above a threshold voltage while the electric motor is outputting a braking torque and providing electrical power to the battery, increase pressure in the pressure galley thereby reducing electrical power to the traction battery via: (i) increase a flow of the pump and/or (ii) control the valve to reduce a size of the valve opening;

wherein the controller is further configured to increase the flow of the pump if the flow is below a predetermined threshold, and control the valve to reduce the size of the valve opening and increase the pressure in the pressure galley to discharge the battery in response to the flow of the pump reaching the predetermined threshold.

2. A lift device comprising:

a chassis;

a plurality of traction devices to support the chassis on an underlying surface;

an electric motor drivingly coupled to at least one of the plurality of traction devices;

a motor controller in electrical communication with the electric motor;

a traction battery in electrical communication with the electric motor via the motor controller; and a hydraulic circuit with a pump, a pressure galley, a return line, and a valve controlling pressure in the pressure galley and fluidly connecting the pressure galley to the return line;

a pump motor drivingly connected to the pump and in electrical communication with the traction battery;

a user input to control a speed of the lift device; and a controller configured to, in response to a voltage being above a threshold voltage while the electric motor is outputting a braking torque and providing electrical power to the battery, increase pressure in the pressure galley thereby reducing electrical power to the traction battery via: (i) increase a flow of the pump and/or (ii) control the valve to reduce a size of the valve opening;

wherein the controller is further configured to increase the flow of the pump if the flow is below a predetermined flow threshold while controlling the valve to reduce the size of the valve opening and increase the pressure in the pressure galley if the pressure is below a predetermined pressure threshold to discharge the battery.

3. A lift device comprising:

a chassis;

a plurality of traction devices to support the chassis on an underlying surface;

an electric motor drivingly coupled to at least one of the plurality of traction devices;

a motor controller in electrical communication with the electric motor;

a traction battery in electrical communication with the electric motor via the motor controller; and a hydraulic circuit with a pump, a pressure galley, a return line, and a valve controlling pressure in the pressure galley and fluidly connecting the pressure galley to the return line;

a pump motor drivingly connected to the pump and in electrical communication with the traction battery;

a user input to control a speed of the lift device; and a controller configured to, in response to a voltage being above a threshold voltage while the electric motor is outputting a braking torque and providing electrical power to the battery, increase pressure in the pressure galley thereby reducing electrical power to the traction battery via: (i) increase a flow of the pump and/or (ii) control the valve to reduce a size of the valve opening;

wherein the controller is further configured to control the valve to reduce the size of the valve opening and increase the pressure in the pressure galley until the pressure reaches a predetermined pressure threshold to discharge the battery, and increase the flow of the pump in response to the pressure in the pressure galley reaching the predetermined pressure threshold to discharge the battery.

4. The lift device of claim 1 further comprising a lifting mechanism supporting a lifting platform relative to the chassis; and wherein the hydraulic circuit has an actuator positioned to fluidly connect the pressure galley and the return line, the actuator coupled to the lifting mechanism.

5. The lift device of claim 1 wherein the controller is further configured to command the electric motor to output the braking torque in response to receiving a signal from the user input to reduce a speed of the lift device.

6. The lift device of claim 1 wherein the flow of the pump is dependent upon the voltage and the threshold voltage.

7. The lift device of claim 1 wherein the controller is further configured to control the size of the valve opening dependent upon the voltage and the threshold voltage.

8. A lift device comprising:

a chassis;

a plurality of traction devices to support the chassis on an underlying surface;

an electric motor drivingly coupled to at least one of the plurality of traction devices;

a motor controller in electrical communication with the electric motor;

a traction battery in electrical communication with the electric motor via the motor controller; and a hydraulic circuit with a pump, a pressure galley, a return line, and a valve controlling pressure in the pressure galley and fluidly connecting the pressure galley to the return line;

a pump motor drivingly connected to the pump and in electrical communication with the traction battery;

a user input to control a speed of the lift device; and a controller configured to, in response to a voltage being above a first threshold voltage while the electric motor is outputting a braking torque and providing electrical power to the battery, increase pressure in the pressure galley thereby reducing electrical power to the traction battery via: (i) increase a flow of the pump and/or (ii) control the valve to reduce a size of the valve opening; and wherein the controller is further configured to reduce the braking torque output from the electric motor in response to the voltage being above a second threshold voltage, the second threshold voltage being greater than the first threshold voltage.

9. The lift device of claim 8 further comprising a parking brake associated with at least one of the plurality of traction devices;

wherein the controller is configured to command the parking brake to engage to stop the lift device in response to the voltage being above the second threshold voltage and if the speed of the lift device is increasing.

10. The lift device of claim 1 further comprising an internal combustion engine drivingly connected to the pump motor via a one-way clutch.

11. A lift device comprising:

a chassis;

a plurality of traction devices to support the chassis on an underlying surface;

an electric motor drivingly coupled to at least one of the plurality of traction devices;

a motor controller in electrical communication with the electric motor;

a traction battery in electrical communication with the electric motor via the motor controller; and a hydraulic circuit with a pump, a pressure galley, a return line, and a valve controlling pressure in the pressure galley and fluidly connecting the pressure galley to the return line;

a pump motor drivingly connected to the pump and in electrical communication with the traction battery;

an internal combustion engine drivingly connected to the pump motor via a one-way clutch;

a user input to control a speed of the lift device; and a controller configured to, in response to a voltage being above a threshold voltage while the electric motor is outputting a braking torque and providing electrical power to the battery, increase pressure in the pressure galley thereby reducing electrical power to the traction battery via: (i) increase a flow of the pump and/or (ii) control the valve to reduce a size of the valve opening;

wherein the controller is further configured to, in response to the voltage being above the threshold voltage, control a speed of the pump motor to be greater than the speed of the engine when the engine is operating, and the electric motor is outputting the braking torque.

12. A lift device comprising:

a chassis;

a plurality of traction devices to support the chassis on an underlying surface;

an electric motor drivingly coupled to at least one of the plurality of traction devices;

a motor controller in electrical communication with the electric motor;

a traction battery in electrical communication with the electric motor via the motor controller; and a hydraulic circuit with a pump, a pressure galley, a return line, and a valve controlling pressure in the pressure galley and fluidly connecting the pressure galley to the return line;

a pump motor drivingly connected to the pump and in electrical communication with the traction battery;

a user input to control a speed of the lift device; and a controller configured to, in response to a voltage being above a threshold voltage while the electric motor is outputting a braking torque and providing electrical power to the battery, increase pressure in the pressure galley thereby reducing electrical power to the traction battery via: (i) increase a flow of the pump and/or (ii) control the valve to reduce a size of the valve opening; and wherein the controller is further configured to, in response to a temperature of the traction battery being outside a predetermined range, limit charging of the battery by increasing the flow of the pump and/or controlling the valve to reduce the size of the valve opening.

13. The lift device of claim 1 wherein the controller is further configured to, in response to a voltage of the traction battery being above a predetermined battery threshold, limit charging of the battery by increasing the flow of the pump and/or controlling the valve to reduce the size of the valve opening.

14. The lift device of claim 1 wherein the traction battery is charged via electrical power from the motor controller while the voltage is above the threshold voltage and the electric motor is outputting the braking torque.

15. A lift device comprising:

a chassis;

a plurality of traction devices to support the chassis on an underlying surface;

an electric motor drivingly coupled to at least one of the plurality of traction devices;

a motor controller in electrical communication with the electric motor;

a traction battery in electrical communication with the electric motor via the motor controller; and a hydraulic circuit with a first pump, a second pump, a pressure galley, a first pump valve fluidly connecting the first pump to the pressure galley, a second pump valve fluidly connecting the second pump to the pressure galley, a return line, and a valve controlling pressure in the pressure galley and fluidly connecting the pressure galley to the return line;

a pump motor drivingly connected to the pump and in electrical communication with the traction battery, wherein the pump motor is drivingly connected to the second pump;

a user input to control a speed of the lift device; and a controller configured to, in response to a voltage being above a threshold voltage while the electric motor is outputting a braking torque and providing electrical power to the battery, increase pressure in the pressure galley thereby reducing electrical power to the traction battery via: (i) increase a flow of the pump and/or (ii) control the valve to reduce a size of the valve opening;

wherein the controller is further configured to, in response to the voltage being above the threshold voltage while the electric motor is outputting the braking torque and providing electrical power to the battery, increase a flow of at least one of the first pump and the second pump and control the valve to reduce a size of the valve opening and increase pressure in the pressure galley thereby discharging the traction battery.

16. The lift device of claim 15 wherein the controller is further configured to, increase the flow of at least one of the first pump and the second pump by: closing the first pump valve and opening the second pump valve in response to the speed being below a first speed, opening the first pump valve and closing the second pump valve in response to the speed being above the first speed and below a second speed, closing the first and second pump valves such that flow from the first and second pumps is directed to the pressure galley in response to the speed being above the second speed, and increasing the pump motor if the first and second pump valves are open and if the speed is below a predetermined pump speed to discharge the battery.

17. The lift device of claim 1 wherein the plurality of traction devices are without a service braking system.

* * * * *